US006781551B2

(12) United States Patent
Gerber

(10) Patent No.: US 6,781,551 B2
(45) Date of Patent: Aug. 24, 2004

(54) HAND-HELD TRANSMITTER AND/OR RECEIVER UNIT

(75) Inventor: Louis Gerber, Bern (CH)

(73) Assignee: Phonak AG, Stafa (CH)

( * ) Notice: Subject to any disclaimer, the term of this patent is extended or adjusted under 35 U.S.C. 154(b) by 0 days.

(21) Appl. No.: 10/212,923

(22) Filed: Aug. 6, 2002

(65) Prior Publication Data

US 2004/0027296 A1 Feb. 12, 2004

(51) Int. Cl.[7] .................................................. H01Q 1/24
(52) U.S. Cl. ...................... 343/702; 343/741; 343/866
(58) Field of Search ................................ 343/702, 741, 343/866, 700 MS, 895

(56) References Cited

U.S. PATENT DOCUMENTS

| 4,894,663 | A |   | 1/1990  | Urbish et al.  | 343/702 |
|-----------|---|---|---------|----------------|---------|
| 5,170,173 | A |   | 12/1992 | Krenz et al.   | 343/702 |
| 5,508,709 | A | * | 4/1996  | Krenz et al.   | 343/702 |
| 5,995,052 | A | * | 11/1999 | Sadler et al.  | 343/702 |
| 6,307,511 | B1| * | 10/2001 | Ying et al.    | 343/702 |
| 6,342,859 | B1| * | 1/2002  | Kurz et al.    | 343/702 |
| 6,600,450 | B1| * | 7/2003  | Efanov et al.  | 343/726 |

FOREIGN PATENT DOCUMENTS

| WO | 02 35333 | 2/2002 | ............. G06F/1/16 |

* cited by examiner

Primary Examiner—Hoang V. Nguyen
(74) Attorney, Agent, or Firm—Pearne & Gordon LLP

(57) ABSTRACT

A handheld transmitter and/or receiver for use in a frequency band B with an electric power less than or equal to 10 mW, wherein the frequency band is 50 MHz≦B≦500 MHz. A transmitter and/or receiver module is operationally connected to a transmitter and/or receiver antenna. A casing is made of two parts linked to be mutually movable. At least one predominant part of the module is built into one of the casing parts. The other of the two casing parts includes the antenna.

9 Claims, 2 Drawing Sheets

HAND-HELD TRANSMITTER AND/OR RECEIVER UNIT

Figure 1:
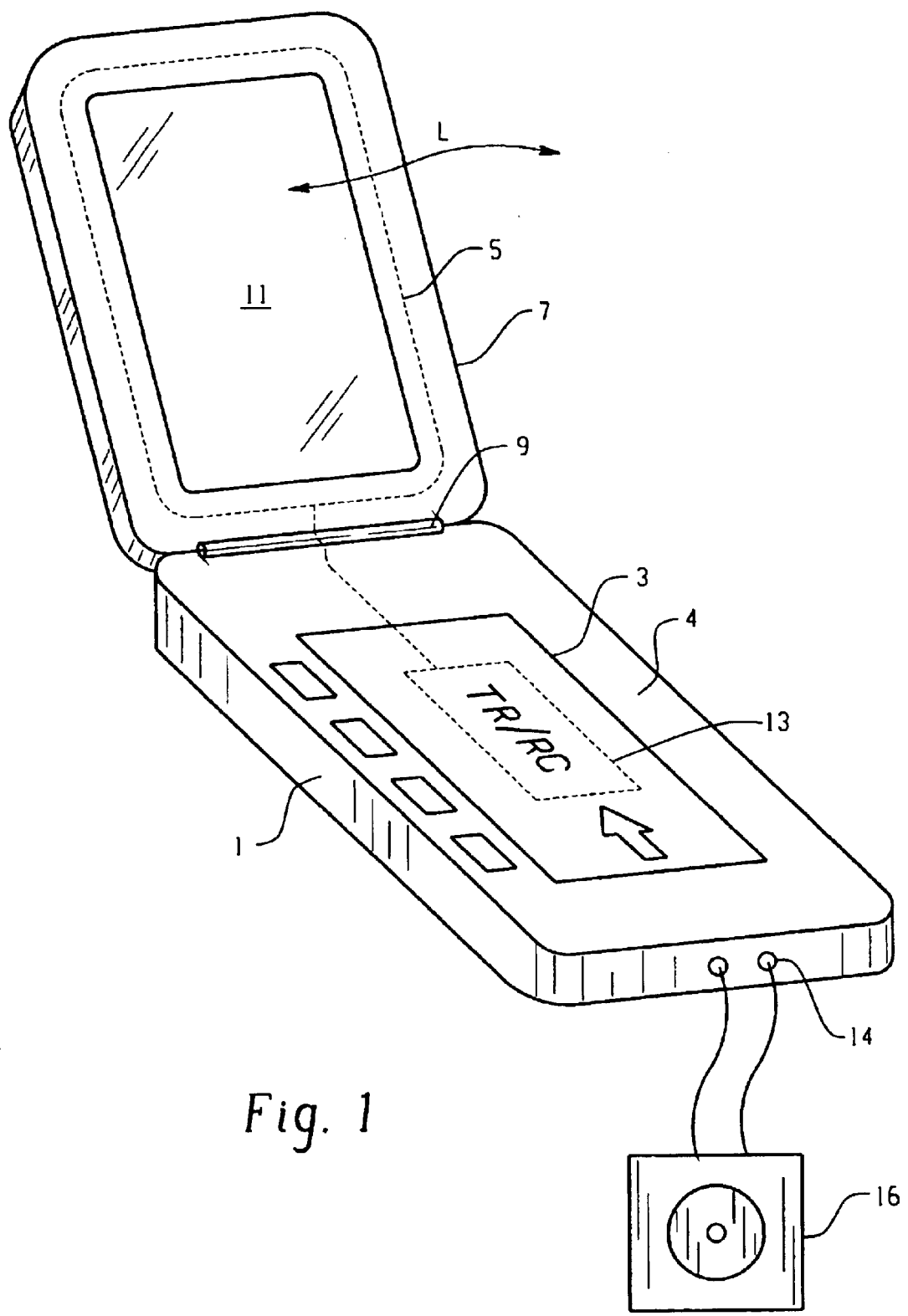

The present invention is directed to a transmitter and/or receiver unit with the extent of a handheld unit.

Current wireless transmitters with the said extent as e.g. 50–75 MHz wireless microphones, which operate in the VHF (160–230 MHz) and/or lower UHF (400–500 MHz) band, use the following types of antennas to transmit the low-power signal, normally only in the range of a few mW:

Wire antennas with a length of a quarter of the wavelength of the carrier signal;

helical antennas.

Both types of antennas are not very practical in handling, helical antennas have a fairly big volume and are therefore not very suited to be included or integrated in a tiny case as for handheld devices.

It is an object of the present invention to provide for a handsome transmitter and/or receiver device, which has the extent of a handheld device, operates in a frequency band B within 50 MHz≦B≦500 MHz and transmits and/or receives with an electric power of at most 2 mW. Such a device is ideally suited to be used together with hearing devices, be it for transmitting signals to hearing devices of to receiving signals from hearing devices. Hearing devices may be e.g. consumer hearing devices, e.g. wireless headphones or hearing aid devices etc.

This is realized by the device comprising a transmitter and/or receiver antenna and a transmitter and/or receiver module, which is operationally connected to the antenna, a casing comprising two linked parts to be movable, at least a predominant part of said module being built into one of said parts, the other of said two parts comprising said antenna being a loop antenna.

Whereas loop antennas are well-known operating for high-power applications, such as radio navigation on ships or television and broadcasting transmitters and receivers, and further may also be found within modern mobile phone systems operating in the upper UHV band and lower microwave bands, such as GSM, DECT, PCS or UMTS, it must be considered that all these applications of loop antennas are not critical with respect to power consumption. For hearing device applications even including in-the-ear hearing aid applications there is considerably restricted space with respect to power supply. Therefore, the power of wirelessly transmitted signals is here at most 2 mW. Further, the addressed applications do not allow in view of the low-power consumption required to raise the frequency of the transmitted and/or received signals. Nevertheless and according to the present invention, it has astonishingly been found that the transmitter and/or receiver device mentioned above may perfectly be equipped with a loop antenna.

In a preferred mode of realization of the device according to the present invention the transmitter and/or receiver module comprises at least one of a display, of a keypad and of a microphone arranged along one side of the one part of the device, whereas the other part, which comprises the loop antenna, forms a preferably slideable or pivotable cover for the side.

Thereby, in a further preferred embodiment the loop antenna is fully integrated within the other part and along its periphery.

In a further preferred embodiment the other part, i.e. that part, wherein the loop antenna resides, is substantially flat. Thereby, in a further preferred embodiment the transmitter and/or receiver unit comprises at least one of a keypad, a display, a microphone along one side of the one part, whereby the other part provides for a cover of the one side and has one of a transparent and of an open central area, which is aligned with the keypad and/or the display and/or the microphone in one position of the other part with respect to the one part. Thereby, the loop antenna is arranged along the periphery of the other part. In a most preferred embodiment the device according to the invention is a wireless microphone or a wireless communication unit to at least one hearing device.

Figure 2:
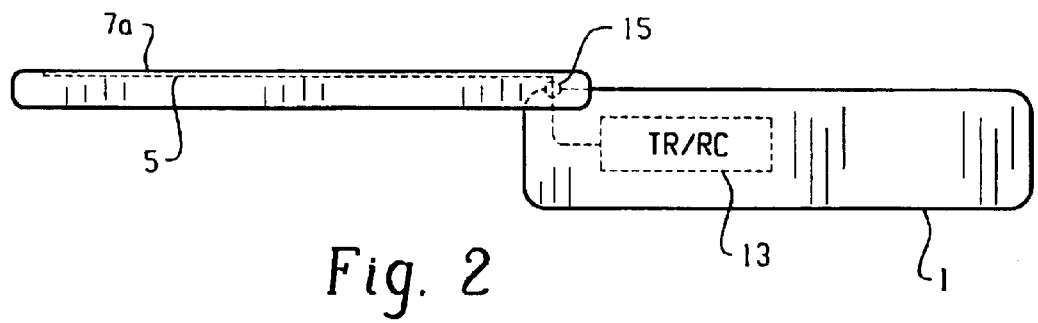
Figure 3:
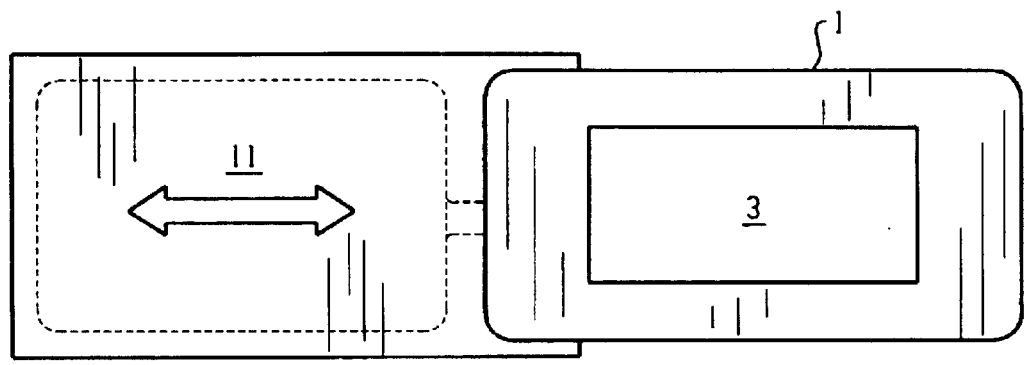
Figure 4:
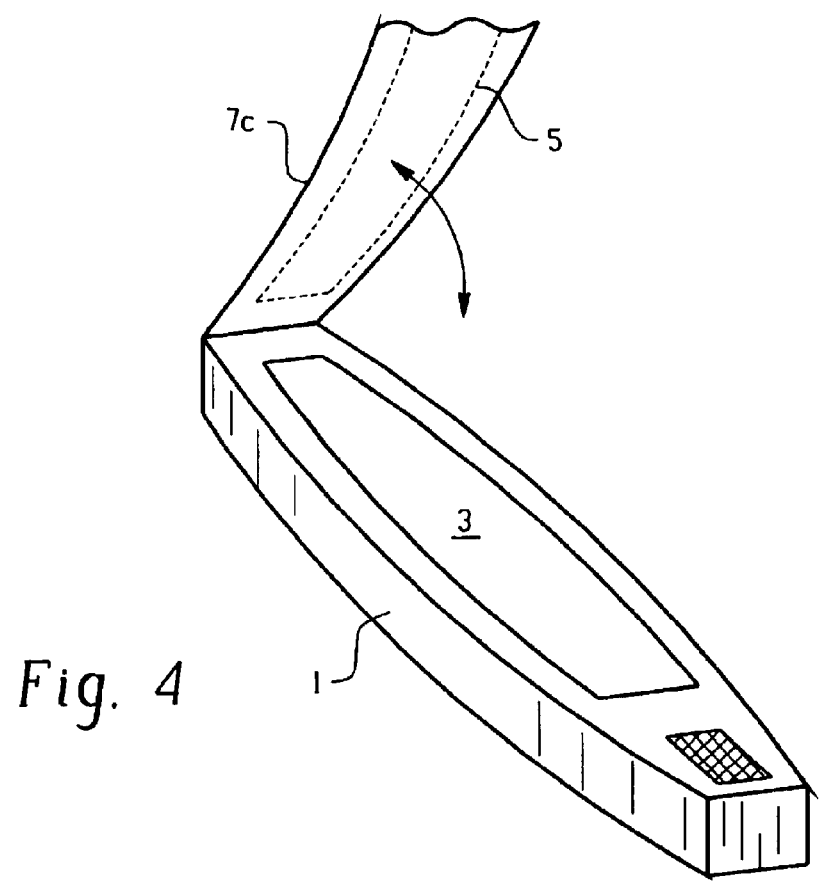

The unit according to the present invention shall now be exemplified with the help of figures. The figures show:

FIG. 1 a perspective schematical view of a transmitter and/or receiver device according to the present invention;

FIG. 2 schematically, a further embodiment of the device according to the present invention in a side-view;

FIG. 3 the embodiment according to FIG. 2 in a top view;

FIG. 4 a further embodiment of the device according to the present invention in a perspective view.

According to FIG. 1 in one preferred embodiment the transmitter and/or receiver device according to the present invention comprises a main body 1 with an extent of a hand-held unit. The device may be e.g. a wireless microphone. The device comprises a functional area 3 on a surface 4 of main body 1. On the functional area and in a preferred embodiment there are situated a microphone arrangement and/or a touch pad and/or a display.

The device may be a remote control unit for one or bidirectional communication with a hearing device, as a wireless headphone or an in-the-ear or an outside-the-ear hearing aid. In such a case area 3 of the main body 1 comprises e.g. a keypad and/or a display and/or a microphone e.g. for voice recognition in the device.

In every case, there is established between the device and a remote receiver and/or transmitter unit a wireless one- or bi-directional link as shown by the double-arrow L in FIG. 1. So as to establish this wireless link there is provided a loop antenna 5, which in the embodiment according to FIG. 1 is integrated into a cover part 7, which is pivotably hinged at the hinge portion 9 to base body 1. Dependent from which kind of functional elements are provided in area 3 of the base body 1, an area 11 of the cover part 7 is conceived to be open or filled with a transparent e.g. foil-like member. Through this area 11 either acoustical signals may impinge on a microphone provided at the main body 1, or, through a foil-like transparent member, keys may be operated, and a display may be watched, arranged in area 3 of the base body 1.

As schematically shown in FIG. 1 in dashed lines beneath area 3 of base body 1, there is provided a transmitter and/or receiver electronic unit 13, which performs for the wireless communication L via the loop antenna 5. If e.g. in the case of a wireless microphone, a microphone arrangement is provided at area 3 of body 1, the acoustical signals received by such microphone and converted to respective electrical signal control the wirelessly transmitted signals to a remote receiver unit, as e.g. to the receiver unit of a hearing device, If the device is or comprises a control unit, again e.g. for a hearing device, control signals input by voice or manually control the respective signals transmitted via link L to the remote receiver. Signals may also be generated at a remote transmitter, e.g. acknowledging reception of command signals from the device, which will be communicated via link L back to the device as shown in FIG. 1, then acting also as a receiver unit, whereat information according to such signals generated at the remote transmitter is e.g. displayed.

In a further embodiment the device as shown in FIG. 1 may include input taps 14 for connecting to external devices, as e.g. to a CD player 16, an MP3 player etc., acting then as a wired communication-/wireless communication-converter station.

The device with an extent according to a hand-held device performs wireless communication L in a frequency band between 50 MHz and 500 MHz, i.e. substantially in a frequency band known as TV-band 3. Preferably it operates at a frequency of about 200 MHz. The power of the transmitted signal is at most 2 mW. Although different modulation types are possible for information transmission via link L, in one preferred embodiment frequency modulation is used, but as known to the skilled artisan, amplitude modulation or more generically phase modulation techniques may be implemented too.

The device as shown in FIG. 1 may be held in the hand of a user, as e.g. when such device is a wireless control unit. In the case of a wireless microphone or control unit with voice recognition and command, it might as well be located at a suited location of the individual, as e.g. tied to his waist belt or suspended around the neck etc. That's why the device according to the present invention is not necessarily a hand-held device, but has the extent of such a hand-held device.

In the embodiment according to the FIGS. 2 and 3 the part of the device according to the present invention, wherein the loop antenna 7 is incorporated, is not realized as a pivotable part, as in the embodiment of FIG. 1, but as a slideable cover 7a. As schematically shown in FIG. 2 as soon as the part 7a of the device is slideably drawn in its outermost position, an electrical contact 15 is established between the output and/or input of the transmitter and/or receiver unit 13 and the loop antenna 5.

In the embodiment of FIG. 1 as well as in the embodiment of FIG. 2 which is shown in top representation in FIG. 3, the complete frame part of the cover part 7 or 7a may be metallic and thereby be and form the loop antenna. On the other hand and as preferred the part 7 or 7a is made e.g. of a plastic material and the antenna 5 is embedded therein as a thin wire.

In the embodiment according to FIG. 4 the mere fact that the loop antenna may be realized by a relatively thin wire is exploited, in that the cover part 7c, wherein the antenna is incorporated, is conceived as a flexible, bendable cover part, as of leather or flexible plastic material, linked at one end to the base body 1 of the device and openable by mere bending up.

What is claimed is:

1. A transmitter and/or receiver device with the extent of a handheld unit, comprising a transmitter and/or receiver antenna and a transmitter and/or receiver module operationally connected to said antenna, a casing comprising two parts linked to be mutually movable, at least a predominant part of said module being built into one of said parts, the other of said two parts comprising said antenna which is a loop antenna, said device transmitting and/or receiving in a frequency band B within 50 MHz$\leq$B$\leq$500 MHz and with an electric power of at most 10mW.

2. The device of claim 1, wherein said transmitter and/or receiver module comprises at least one of a display, of a keypad and of a microphone, said at least one of said keypad, said display and said microphone being arranged along one side of said one part, said other part forming a cover for said side of said one part.

3. The device of claim 1, wherein said loop antenna is integrated within said other part and along the periphery of said other part.

4. The device of claim 1, wherein said other part at least substantially consists of said antenna.

5. The device of claim 1, wherein said other part is substantially flat.

6. The device of claim 1, said transmitter and/or receiver unit comprising at least one of a keypad, of a display and of a microphone provided along one side of said one part, said other part providing for a cover of said side and having one of a transparent and of an open central area aligned with at least one of said keypad, said display and said microphone in one position of said other part with respect to said one part, said loop antenna being arranged around said area.

7. The device of claim 1, said band B being the TV-band 3.

8. The device of claim 1 being a wireless microphone.

9. The device of claim 1 being a wireless communication unit to at least one hearing device.

* * * * *